US010300934B2

(12) United States Patent
Ostergaard

(10) Patent No.: US 10,300,934 B2
(45) Date of Patent: May 28, 2019

(54) WAGON WITH FOLDING SEATS

(71) Applicant: RADIO FLYER INC., Chicago, IL (US)

(72) Inventor: Collin Ostergaard, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 16/138,351

(22) Filed: Sep. 21, 2018

(65) Prior Publication Data

US 2019/0092362 A1   Mar. 28, 2019

Related U.S. Application Data

(60) Provisional application No. 62/563,838, filed on Sep. 27, 2017.

(51) Int. Cl.
*B62B 3/00* (2006.01)
*B62B 3/02* (2006.01)

(52) U.S. Cl.
CPC .............. *B62B 3/007* (2013.01); *B62B 3/001* (2013.01); *B62B 3/003* (2013.01); *B62B 3/025* (2013.01)

(58) Field of Classification Search
CPC ....... B62B 5/06; B62B 3/04; B62B 2202/404; B62B 3/022
See application file for complete search history.

(56) References Cited

U.S. PATENT DOCUMENTS 1,787,245 A * 12/1930 Graham ................. A47B 85/06
297/125
8,851,503 B2 * 10/2014 Tyson, III ............... A47C 1/14
280/648

* cited by examiner

*Primary Examiner* — James A Shriver, II
*Assistant Examiner* — James J Triggs
(74) *Attorney, Agent, or Firm* — Barnes & Thornburg LLP

(57) ABSTRACT

A foldable wagon with steerable front wheels and foldable seats is disclosed. The wagon has a frame having a first end assembly and an opposing second end assembly, a floor assembly and 4 wheels. The wagon also has seat assemblies comprising a first seat, a front support, and a rear support, wherein the front support for the seat is pivotally connected to a second end of the first seat and pivotally connected to the wagon frame, and wherein the rear support for the first seat is pivotally connected adjacent a first end of the first seat and pivotally connected to the end assembly. The seat is positionable in a use position such that the seat is transverse to the end assembly, and a storage position such that the seat is adjacent and generally parallel to the end assembly.

20 Claims, 17 Drawing Sheets

WAGON WITH FOLDING SEATS

CROSS-REFERENCE TO RELATED APPLICATIONS

This application claims the benefit of U.S. Provisional Patent Application No. 62/563,838, filed Sep. 27, 2017, which is expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a folding wagon that has folding seats.

BACKGROUND

Folding wagons are well known in the art. While such wagons, according to the prior art, provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a wagon having foldable seats. The wagon is also preferably convertible between a use position and a folded or storage position.

The disclosed technology further relates to a wagon, comprising: a frame having a first end assembly and an opposing second end assembly; a floor assembly; a first rear wheel rotatably connected to one of the frame and the second end assembly; a second rear wheel rotatably connected to one of the frame and the second end assembly; a first front wheel pivotally and rotatably connected to one of the frame and the first end assembly; a second front wheel pivotally and rotatably connected to one of the frame and the first end assembly; a steering link pivotally connected to the first end assembly; a handle pivotally connected to the steering link; a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon; a first seat assembly adjacent the first end assembly, the first seat assembly comprising a first seat, a front support for the first seat, and a rear support for the first seat, wherein the front support for the first seat is pivotally connected to a second end of the first seat and pivotally connected to the wagon frame, wherein the rear support for the first seat is pivotally connected adjacent a first end of the first seat and pivotally connected to the first end assembly, wherein the first seat is positionable in a use position such that the first seat is transverse to the first end assembly, and a storage position such that the first seat is adjacent and generally parallel to the first end assembly; and, a second seat assembly adjacent the second end assembly, the second seat assembly comprising a second seat, a front support for the second seat, and a rear support for the second seat, wherein the front support for the second seat is pivotally connected to a second end of the second seat and pivotally connected to the wagon frame, wherein the rear support for the second seat is pivotally connected adjacent a first end of the second seat and pivotally connected to the second end assembly, wherein the second seat is positionable in a use position such that the second seat is transverse to the second end assembly, and a storage position such that the second seat is adjacent and generally parallel to the second end assembly.

The disclosed technology further relates to a wagon, comprising: a frame having a first end assembly and an opposing second end assembly; a handle connected to the wagon adjacent a first end of the frame; a floor assembly connected to the frame between the first end assembly and the second end assembly; a first rear wheel rotatably connected to the frame; a second rear wheel rotatably connected to the frame; a first front wheel rotatably connected to the frame; a second front wheel rotatably connected to the frame; a first seat assembly adjacent the first end assembly, the first seat assembly comprising a first seat, a front support for the first seat, and a rear support for the first seat, wherein the front support for the first seat is pivotally connected to a second end of the first seat and pivotally connected to the wagon frame, wherein the rear support for the first seat is pivotally connected adjacent a first end of the first seat and pivotally connected to the first end assembly, wherein the first seat is positionable in a use position such that the first seat is transverse to the first end assembly, and a storage position such that the first seat is adjacent and generally parallel to the first end assembly; and, a second seat assembly adjacent the second end assembly, the second seat assembly comprising a second seat, a front support for the second seat, and a rear support for the second seat, wherein the front support for the second seat is pivotally connected to a second end of the second seat and pivotally connected to the wagon frame, wherein the rear support for the second seat is pivotally connected adjacent a first end of the second seat and pivotally connected to the second end assembly, wherein the second seat is positionable in a use position such that the second seat is transverse to the second end assembly, and a storage position such that the second seat is adjacent and generally parallel to the second end assembly.

The disclosed technology further relates to a wagon, comprising: a frame having a first end assembly and an opposing second end assembly; a floor assembly comprising a first floor assembly pivotal with respect to the first end assembly and a second floor assembly pivotal with respect to the second end assembly; a first rear wheel rotatably connected to one of the frame and the second end assembly; a second rear wheel rotatably connected to one of the frame and the second end assembly; a first front wheel pivotally and rotatably connected to one of the frame and the first end assembly; a second front wheel pivotally and rotatably connected to one of the frame and the first end assembly; a steering link pivotally connected to the first end assembly; a handle pivotally connected to the steering link; a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon; and, a linkage assembly having a first linkage pivotally connected to the first end assembly and a second linkage pivotally connected to the second end assembly, the first linkage also being pivotally connected to the second linkage, wherein the wagon is moveable between an open configuration and a folded configuration, and wherein in the open configuration of the wagon the first floor assembly and the second floor assembly are positioned below a top of the wheels of the wagon.

The disclosed technology further relates to a wagon wherein the floor assembly comprises a first floor assembly pivotal with respect to the first end assembly and a second floor assembly pivotal with respect to the second end assembly, and further comprising a linkage assembly having a first linkage pivotally connected to the first end assembly and a second linkage pivotally connected to the second end assembly, wherein the first linkage is also pivotally connected to the second linkage.

The disclosed technology further relates to a wagon that is moveable between an open configuration and a folded configuration, and with a linkage assembly that is positioned below the floor assembly in both the open configuration and the folded configuration.

The disclosed technology further relates to a wagon wherein the wagon is moveable from the open configuration to the folded configuration when the first and second seats are in the use position and when the first and second seats are in the storage position.

The disclosed technology further relates to a wagon wherein the wagon is moveable between an open configuration and a folded configuration, wherein in transitioning from the open configuration to the folded configuration the floor assembly moves in a first plane and the linkage assembly moves in a second plane, and wherein the first and second planes are perpendicular.

The disclosed technology further relates to a wagon wherein the front support for the first seat is positioned generally transverse to the first floor assembly in the use position of the first seat, wherein the front support for the first seat is positioned generally parallel to the first floor assembly in the storage position of the first seat, wherein the front support for the second seat is positioned generally transverse to the second floor assembly in the use position of the second seat, and wherein the front support for the second seat is positioned generally parallel to the second floor assembly in the storage position of the second seat.

The disclosed technology further relates to a wagon wherein in an open configuration of the wagon the first floor assembly and the second floor assembly are positioned below a top of the wheels of the wagon.

The disclosed technology further relates to a wagon wherein the steering link is pivotable in a first direction, wherein the handle is pivotable in the steering link in a second direction, and wherein the first direction is substantially perpendicular to the second direction.

The disclosed technology further relates to a wagon wherein the first front wheel is pivotally and rotatably connected to the first end assembly, wherein the second front wheel is pivotally and rotatably connected to the first end assembly, and further comprising a steering link pivotally connected to the first end assembly, the handle being pivotally connected to the steering link, and a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

The disclosed technology further relates to a wagon having a fabric housing around the frame of the wagon.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure.

Figure 1:
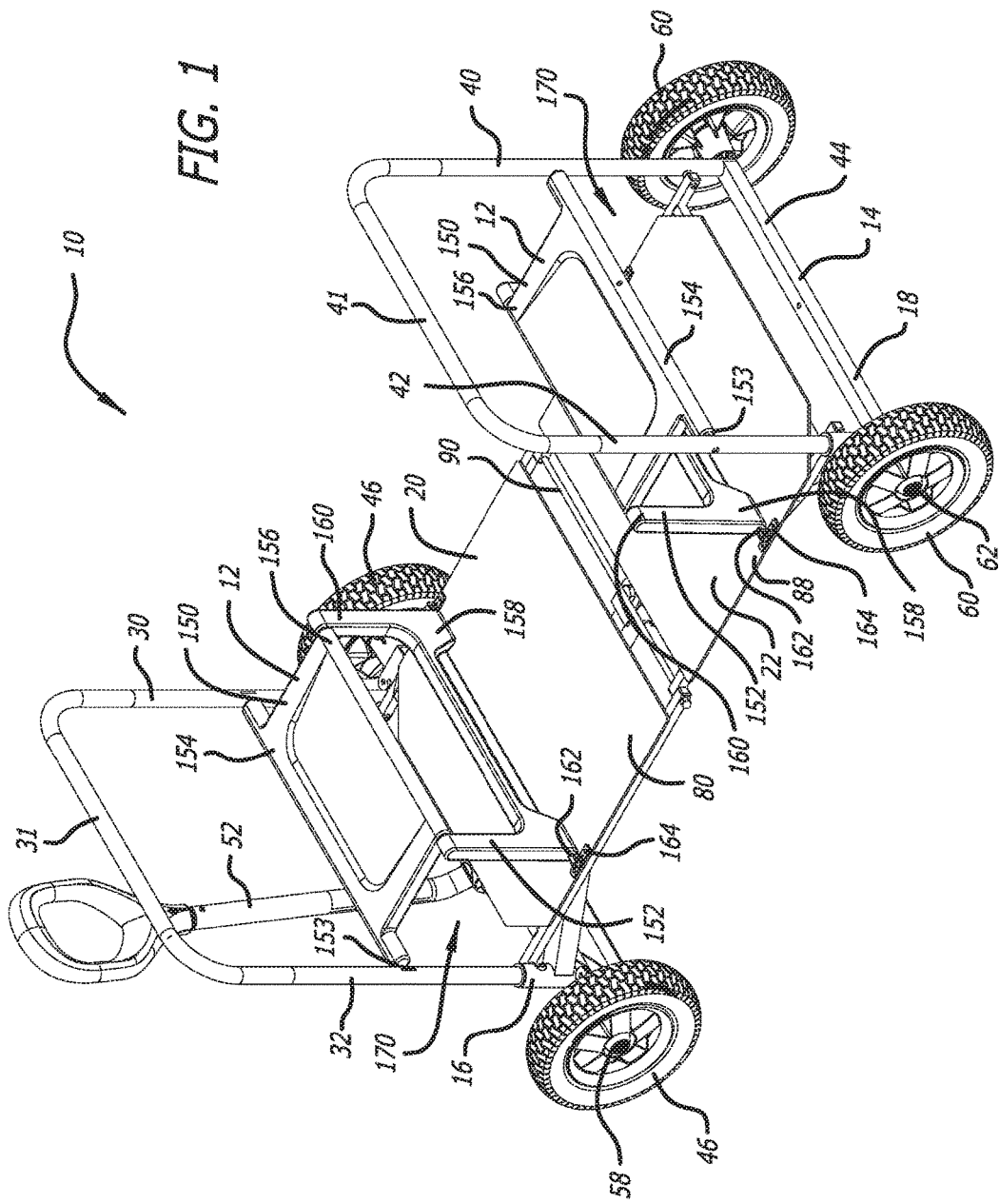
FIG. 1 is a top rear perspective view of a folding wagon having folding seats, with the folding seats in the raised position.
Figure 2:
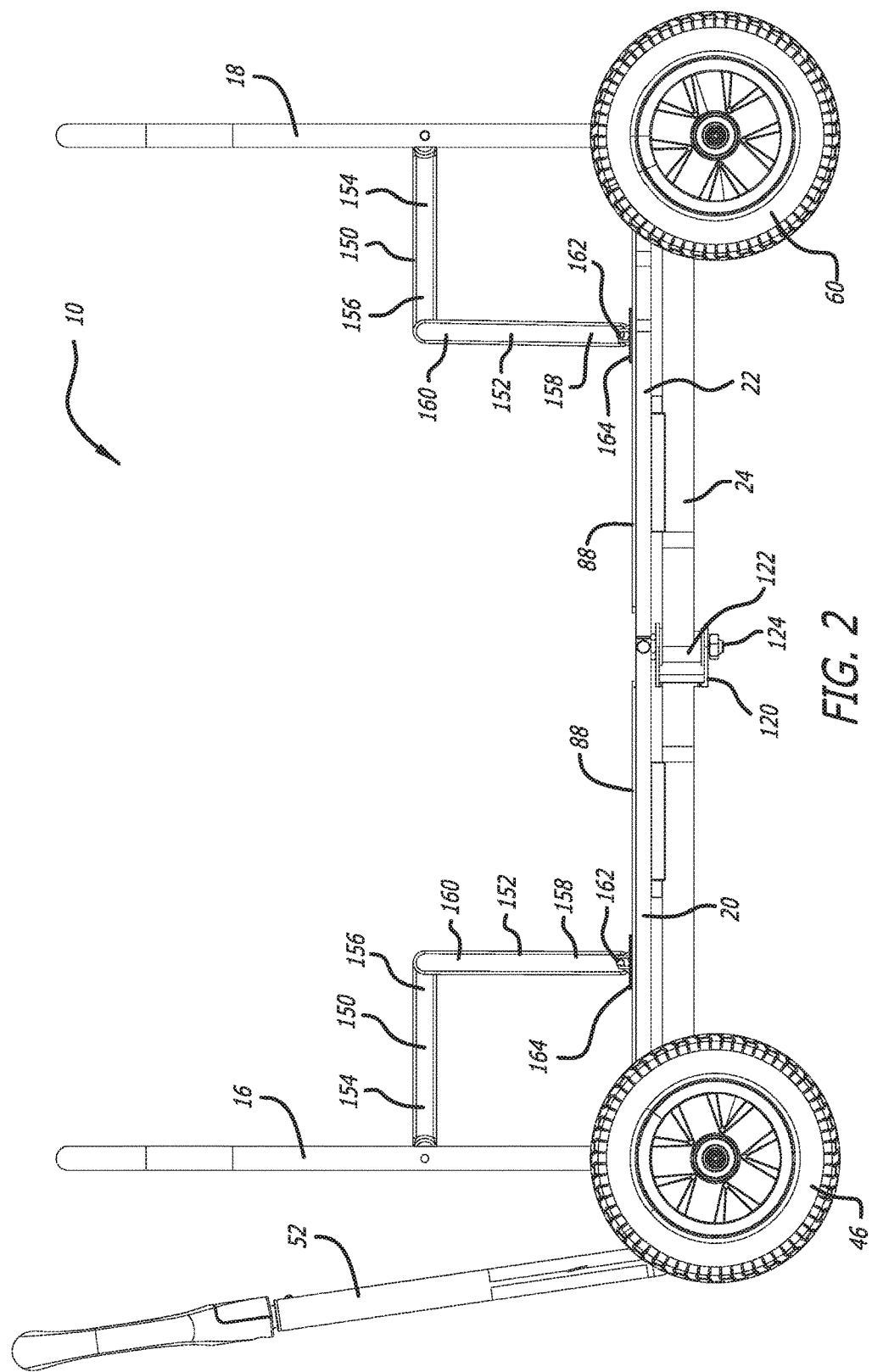
FIG. 2 is a side elevation view of the folding wagon of FIG. 1.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the wagon with foldable seats discussed herein is susceptible of embodiments in many different forms, there is shown in the drawings, and will herein be described in detail, preferred embodiments with the understanding that the present description is to be considered as an exemplification of the principles of the wagon with foldable seats and is not intended to limit the broad aspects of the disclosure to the embodiments illustrated. Thus, the detailed description set forth below is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 7:
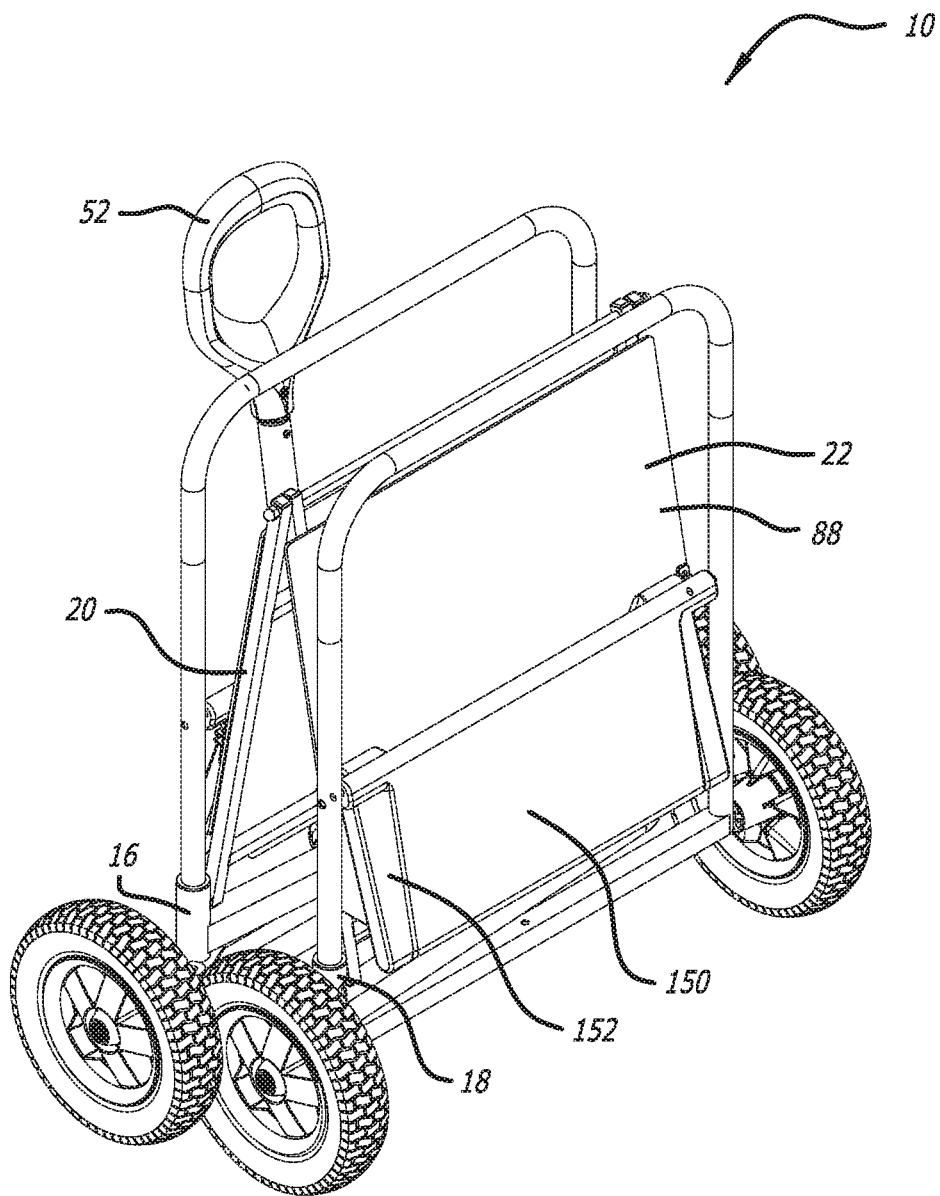
FIG. 7 is a side perspective view of the folding wagon of FIG. 4 in the folded configuration.

Referring now to the figures, multiple embodiments of a wagon 10 having a foldable seat 12 that is positionable in two orientations are illustrated. In various embodiments the wagon 10 may be a foldable wagon 10 that includes a collapsible frame assembly 14 that is moveable between an open, unfolded or use configuration (FIGS. 1-6, and 8-17) and a collapsed or folded configuration (FIG. 7).

Figure 8:
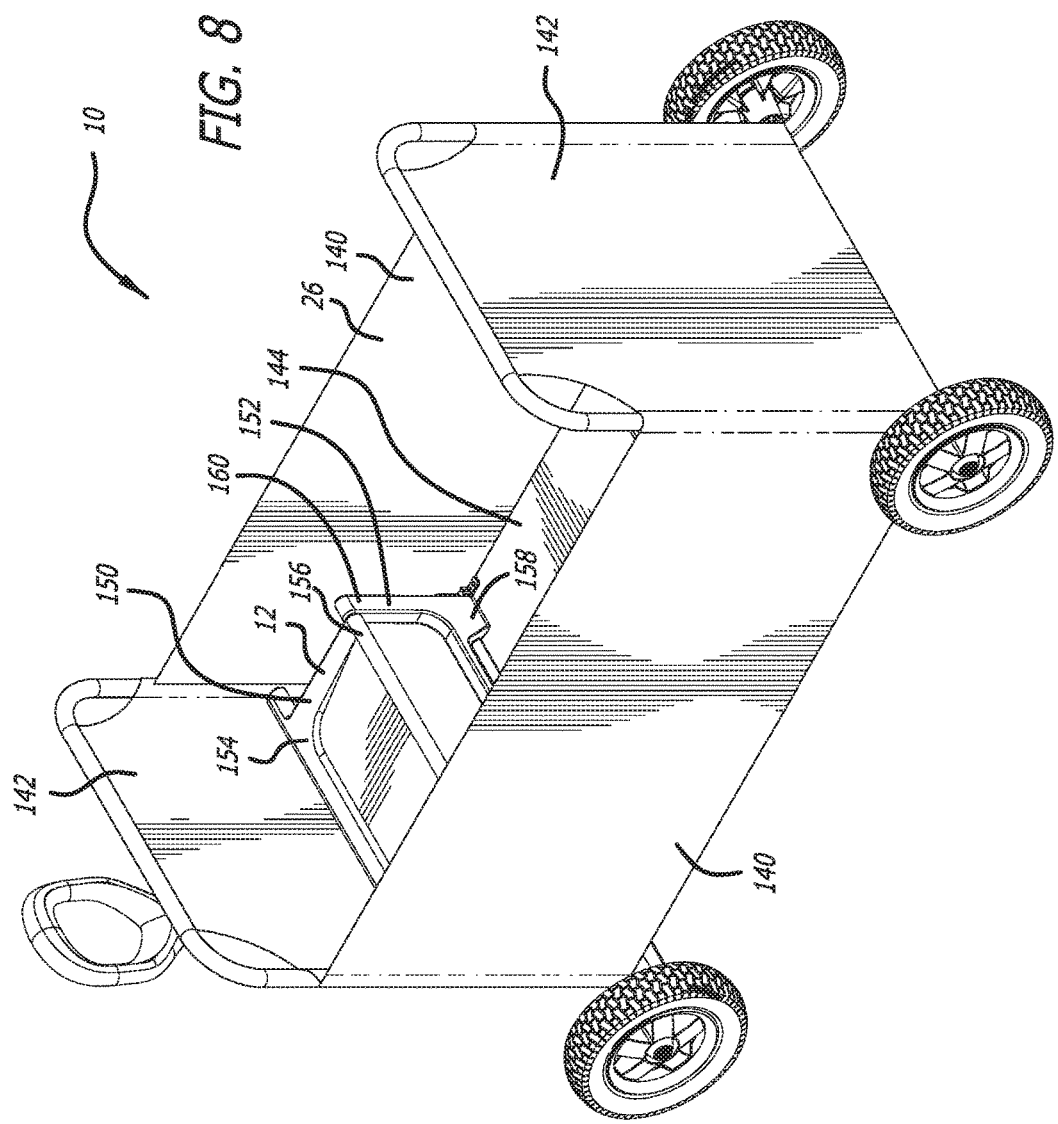
FIG. 8 is a top rear perspective view of the foldable wagon of FIG. 1, with the foldable wagon frame in the unfolded or use configuration and with a flexible housing connected to the foldable frame.

In various embodiments the wagon 10 to which the foldable seat 12 is attached is a foldable wagon, however, the multiple-position foldable seats 12 may be used with other types of wagons, including wooden wagons, plastic wagons, and wagons that do not fold. Additionally, the folding wagon 10 may be used without folding seats 12. In various embodiments of the wagon 10 where the wagon 10 is foldable, the wagon 10 has a frame assembly 14 that includes a first end assembly 16, an opposing second end assembly 18, a floor assembly which may include a first floor assembly 20 preferably pivotally connected to and extending from the first end assembly 16 and a second floor assembly 22 preferably pivotally connected to and extending from the second end assembly 18, and a linkage assembly 24 connecting the first end assembly 16 to the second end assembly 18. Additionally, as shown in FIG. 8, in various embodiments the foldable wagon 10 includes a flexible housing 26 connected to the foldable frame assembly 14. As shown in the figures, the floor assembly may be connected to the frame 14 between the first end assembly 16 and the second end assembly 18. Further, the first floor assembly 20 may be pivotal with respect to the first end assembly 16 and the second floor assembly 22 may be pivotal with respect to the second end assembly 18.

Figure 9:
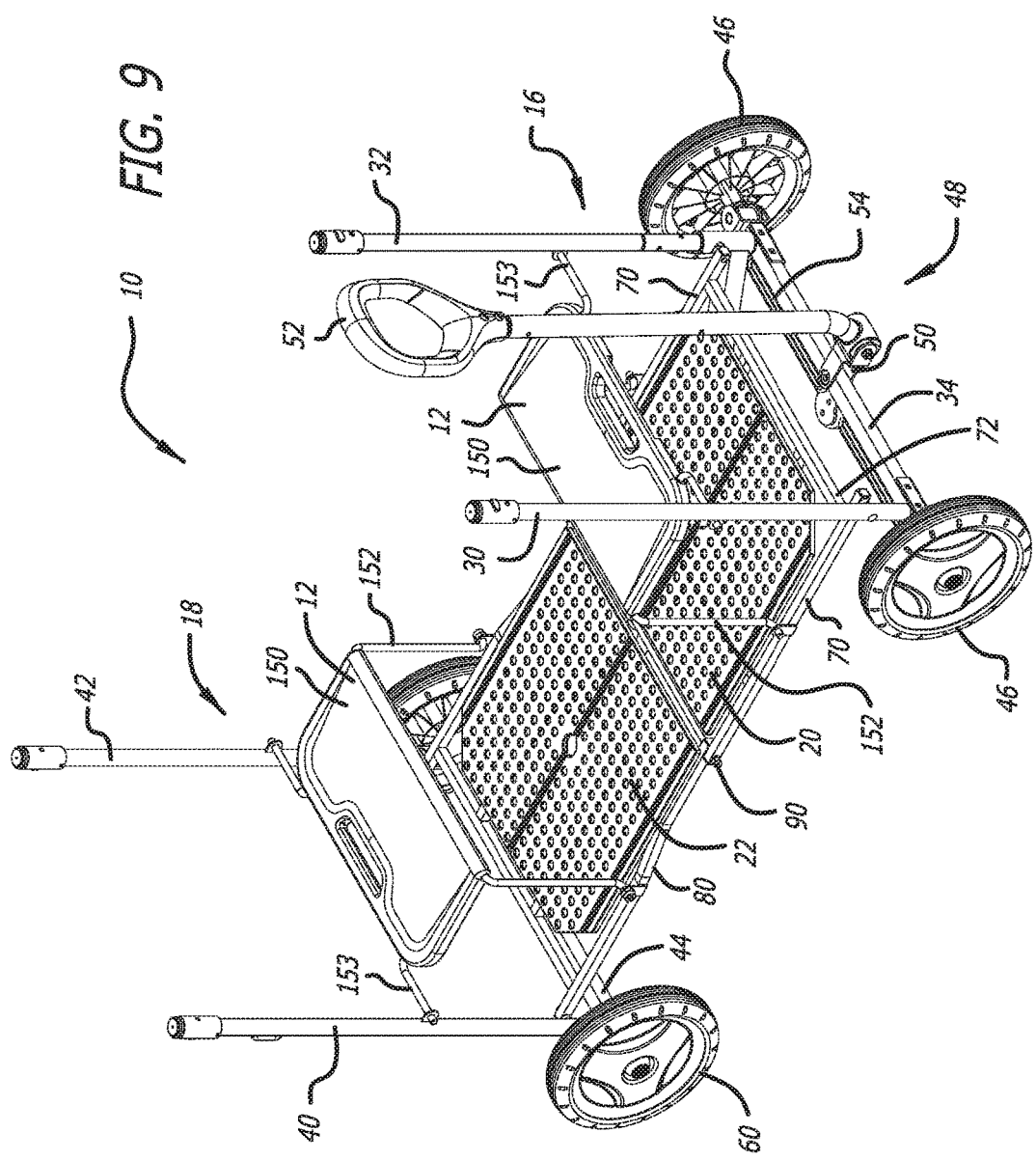
FIG. 9 is a top front perspective view of another embodiment of a folding wagon having folding seats, with the folding seats in the raised or use position.
Figure 10:
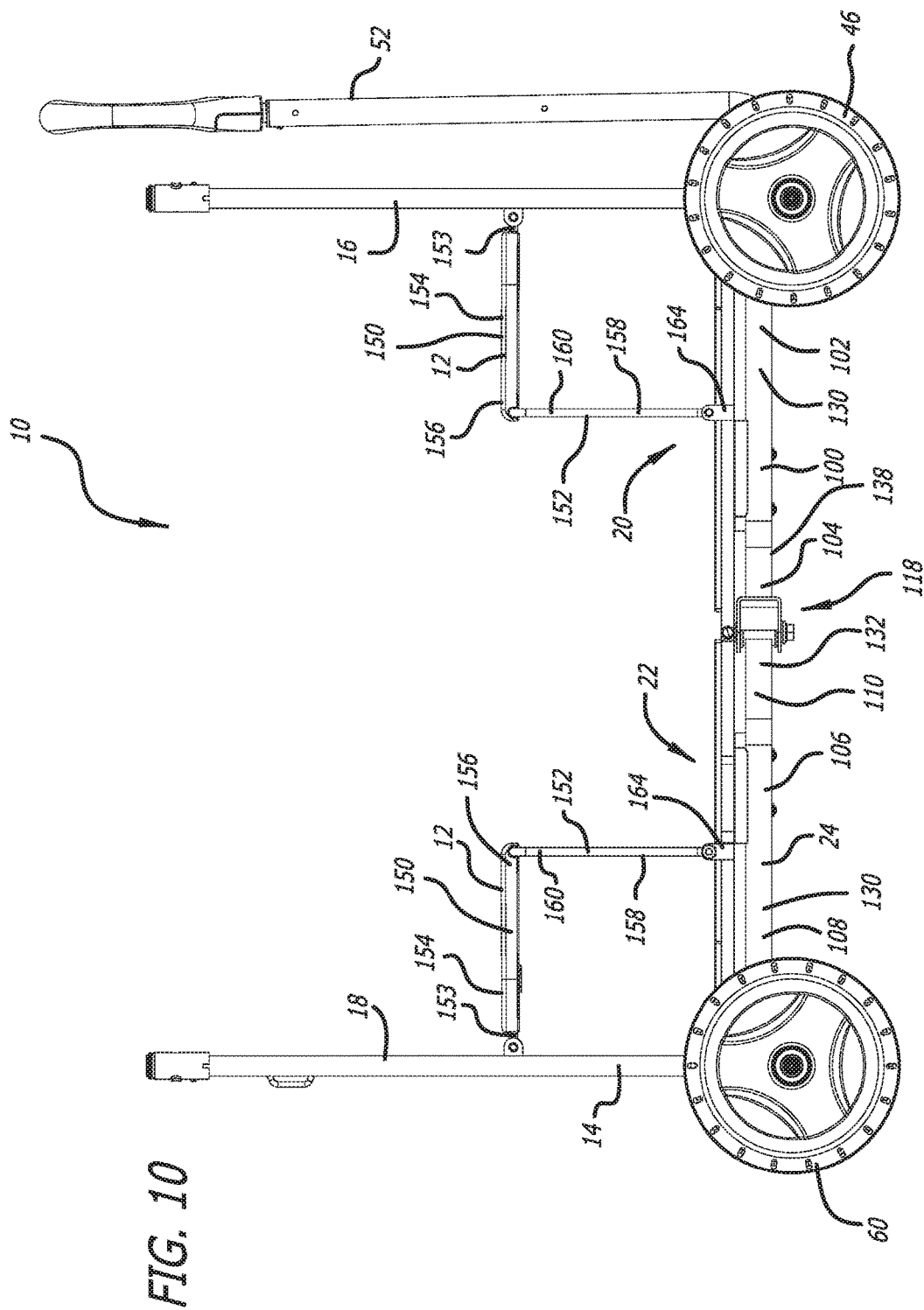
FIG. 10 is a side elevation view of the folding wagon of FIG. 9.

In one embodiment, such as shown in FIGS. 1-4, the first end assembly 16 generally comprises two vertical members 30 and 32, connected by a front lower cross support 34 towards a bottom of the two vertical members 30 and 32. Additionally, a front upper cross support 31 may connect the two vertical members 30 and 32 toward a top of the vertical members 30, 32. In an alternate embodiment, such as shown in FIGS. 9 and 10, the no front upper cross support 31 is required. Additionally, telescoping canopy supports may be housed in the vertical members 30 and 32.

Figure 11:
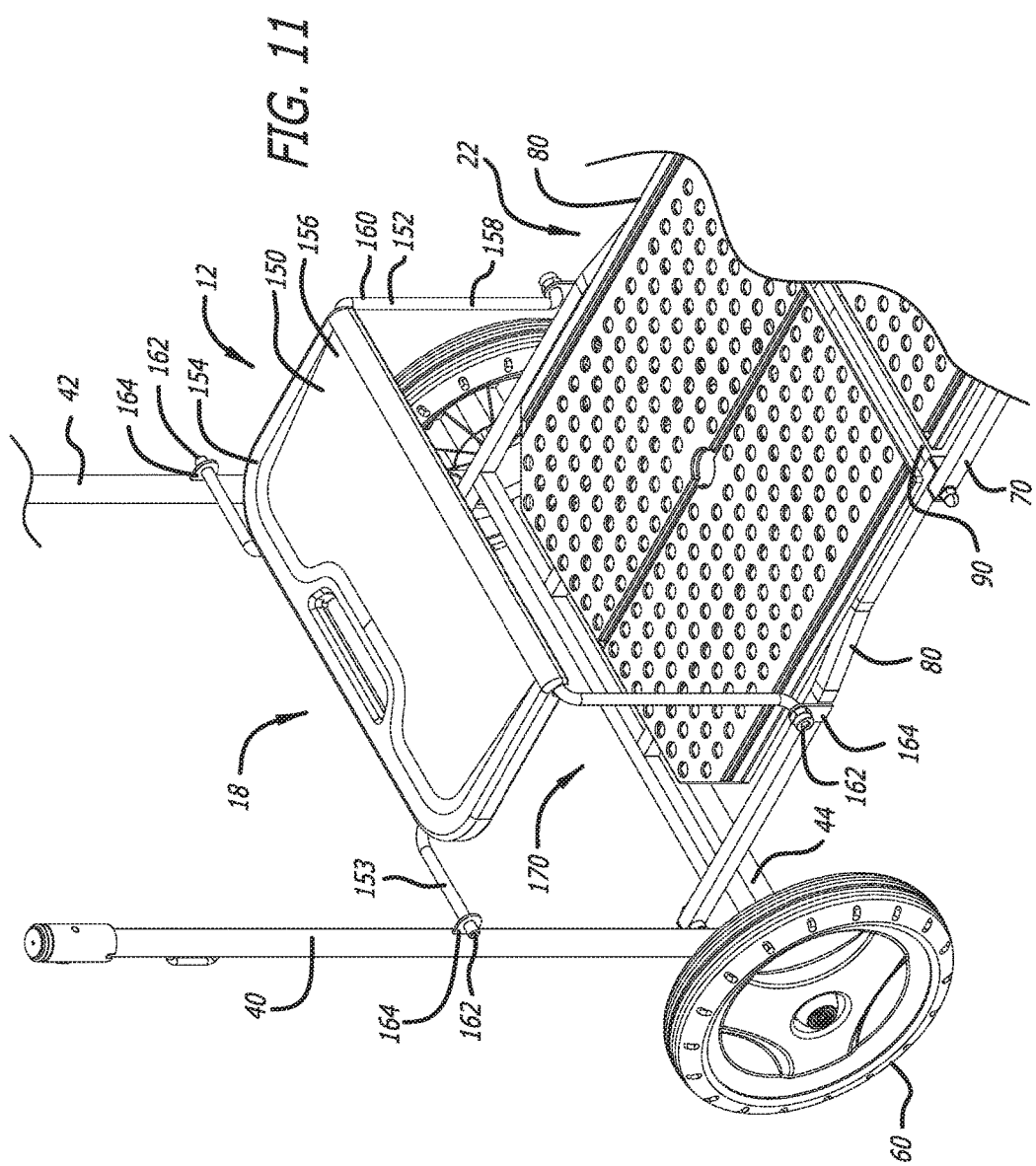
FIG. 11 is a partial top perspective view of the rear seat of the folding wagon of FIG. 9 with the seat in the use position.

Similarly, in one embodiment, such as shown in FIGS. 1-4, the second end assembly 18 generally comprises two vertical members 40 and 42, connected by a rear lower cross support 44 towards a bottom of the two vertical members 40 and 42. A rear upper cross support 41 may connect the two vertical members 40 and 42 toward a top of the vertical members 40, 42. In an alternate embodiment, such as shown in FIGS. 9-11, the no rear upper cross support 41 is required. Additionally, telescoping canopy supports may be housed in the vertical members 40 and 42.

In various embodiments, the foldable wagon 10 includes two front wheels 46 (i.e., a first front wheel 46 and a second front wheel 46) rotatably and pivotally connected to one of the frame 14 and the first end assembly 16, and in various embodiments preferably connected to a steering assembly 48. In one embodiment, the steering assembly 48 generally comprises a steering link 50 pivotally connected to the front lower cross support 34 of the first end assembly 16 and pivotable in a plane parallel to the front lower cross support 34, a handle 52 pivotally connected to the steering link 50 and pivotable in a plane transverse to the pivoting of the pivoting steering link 50, a tie rod 54 connected to and driven by the steering link 50, and a steering knuckle 56 pivotally connected at each end of the front lower cross support 34. The tie rod 54 is connected at each end to opposing steering knuckles 56, and the front wheels 46 are rotatably connected, respectively, to the steering knuckles 56. Alternately, the tie rods 54 may be said to be connected to the front wheels 46 because the front wheels 46 are rotationally connected to the knuckles 56. Accordingly, when the handle 52 is moved in a lateral direction, the steering link 50 will pivot with the handle 52 and cause the tie rod 54 to move laterally in the direction of the handle 52 movement. Further, the tie rod 54 will simultaneously pivot each of the steering knuckles 56 which results in the turning of the front wheels 46 to turn the wagon 10. Thus, the front wheels 46 will turn in the direction pulled by the user. Further, the front wheels 46 rotate about their axles 58. Alternately, pivotable caster assemblies may be utilized in connection with the two front wheels 46. Based on one configuration, the steering link is pivotable in a first direction, and the handle is pivotable in the steering link in a second direction, and the first direction is substantially perpendicular to the second direction.

The folding wagon 10 also has two rear wheels 60. In one embodiment, the rear wheels 60 (i.e., a first rear wheel 60 and a second rear wheel 60) have axles 62 that are rotatably connected at opposing sides of the frame assembly 14, and preferably the second end assembly 18, and preferably are connected to the rear lower cross support 44.

Figure 3:
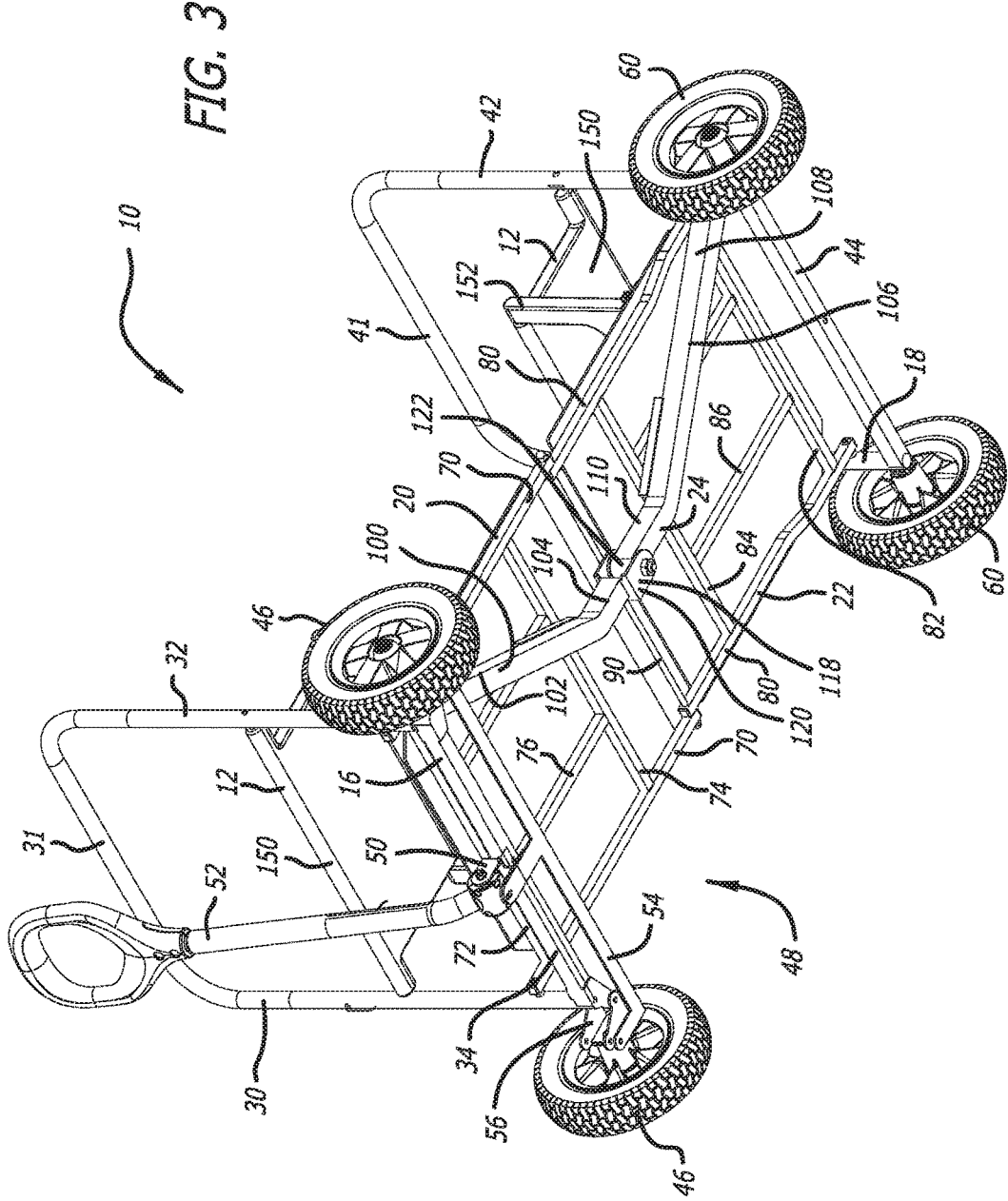
FIG. 3 is a bottom front perspective view of the folding wagon of FIG. 1.

As shown in FIGS. 3 and 9, in various embodiments the first floor assembly 20 is pivotally connected to and extends from the first end assembly 16. In one embodiment the first floor assembly 20 generally comprises two side members 70, a first end member 72, a second end member 74, and a plurality of central support members 76. In one embodiment the first end member 72 is pivotally connected between the two vertical members 30, 32 of the first end assembly 16. Shoulder bolts or other rotatable fastening mechanisms may be used to pivotally connect the first end member 72 between and to the two vertical members 30, 32 of the first end assembly 16. The two side members 70 are preferably fixed adjacent opposing ends of the first end member 72 and extend toward a center of the floor of the wagon 10. The second end member 74 and a plurality of central support members 76 are utilized to provide rigidity to the first floor assembly 20.

Similarly, the second floor assembly 22 of the various embodiments is pivotally connected to and extends from the second end assembly 18. In one embodiment the second floor assembly 22 generally comprises two side members 80, a first end member 82, a second end member 84, and a plurality of central support members 86. In one embodiment the first end member 82 is pivotally connected between the two vertical members 40, 42 of the second end assembly 18. Shoulder bolts or other rotatable fastening mechanisms may be used to pivotally connect the first end member 82 between and to the two vertical members 40, 42 of the second end assembly 18. The two side members 80 are preferably fixed adjacent opposing ends of the second end member 82 and extend toward a center of the floor of the wagon 10. The second end member 84 and a plurality of central support members 86 are utilized to provide rigidity to the second floor assembly 22. In various embodiments, floor panels 88 may be secured to a top of the floor assemblies 20, 22 to provide a base or floor for the wagon 10, on which the flexible housing 26 may rest.

In various embodiments, the first and second floor assemblies 20, 22 are connected at a center brace 90. Preferably, the center brace 90 is pivotally connected to the first floor assembly 20 and the second floor assembly 22 to allow the first floor assembly 20 to be pivotally connected to the second floor assembly 22. In one embodiment, the center brace 90 is an elongated member, such as a round or other shaped tube or solid member, that extends to connect each of the side members 70 and 80 of the first and second floor assemblies 20, 22 thereto. Additionally, in a preferred embodiment, the width of at least a portion of the first floor assembly 20 is greater than the width of at least a portion of the second floor assembly 22 to allow for at least a portion of the side members 70 of the first floor assembly 20 to be exterior but adjacent the side members 80 of the second floor assembly 20 for clearance purposes. The first and second floor assemblies 20, 22 define the floor of the wagon 10. In an open configuration of the wagon the first floor assembly and the second floor assembly are positioned below a top of the wheels of the wagon and generally in-line with the axle of the wheels. When transitioning the wagon from the open configuration to the folded configuration, the floor assemblies moves in a first plane and the linkage assembly moves in a second plane. Further, the first and second planes are perpendicular.

As best shown in FIG. 3, the linkage assembly 24 preferably connects the first end assembly 16 to the second end assembly 18, and provides rigidity to the wagon in both the open and closed configurations, but also allows the wagon 10 to be collapsed or folded such that the first end assembly 16 and second end assembly 18 are adjacent one another (see FIG. 7). In one embodiment the linkage assembly 24 comprises a first end linkage 100 and a second end linkage 106. The first end linkage 100 has a first end 102 and a second end 104. The first end 102 of the first end linkage 100 is pivotally connected to the first end assembly 16. The second end linkage 106 has a first end 108 and a second end 110. The first end 108 of the second end linkage 106 is pivotally connected to the second end assembly 18.

Further, in embodiments the second end 104 of the first end linkage 100 is pivotally connected to the second end 110 of the second end linkage 106. In embodiments the pivot connection 118 between the first end linkage 100 and the second end linkage 106 is that of a clevis and tang orientation. For example, one of the second end 104 of the first end linkage 100 or the second end 110 of the second end linkage 106 has a clevis 120, and the other of the second end 104 of the first end linkage 100 or the second end 110 of the second end linkage 106 has a tang 122 that fits within the clevis 120. A pin 124 joins the clevis 120 and tang 122, and allows the first end linkage 100 and the second end linkage 106 to pivot with respect to one another during opening and closing of the wagon 10. The first end linkage 100 and the second end linkage 106 form a two-bar linkage to assist in keeping the first end assembly 16 secured to the second end assembly 18 in both the open configuration and the collapsed configuration, as well as in the transition between the open and collapsed configuration. Further, in a preferred embodiment, the first end linkage 100 and the second end linkage 106 each have a first section 130 that extends at an angle to the first and second end assemblies 16, 18, and a second section 132 that extends generally parallel to the longitudinal axis of the wagon 10. The second sections 132 meet at the pivot connection 118 between the first and second end linkages 100, 106. In a preferred embodiment, the linkage assembly is always positioned below the floor assembly, including in both the open configuration and the folded configuration, and during the transition therebetween.

In one embodiment, the wagon 10 also includes a housing assembly 26 that defines sidewalls and preferably a bottom or floor of the wagon 10. In a preferred embodiment, the housing assembly 26 is made of fabric and is referred to as the flexible housing 26. As shown in FIG. 8, the flexible housing 26 preferably includes side portions 140, end portions 142 and a bottom wall 144 or floor 144.

It is also understood that the wagon 10 may be operated without a housing assembly 26. In this orientation, the wagon frame 14 would provide structure for hauling whatever the user desires.

Figure 12:
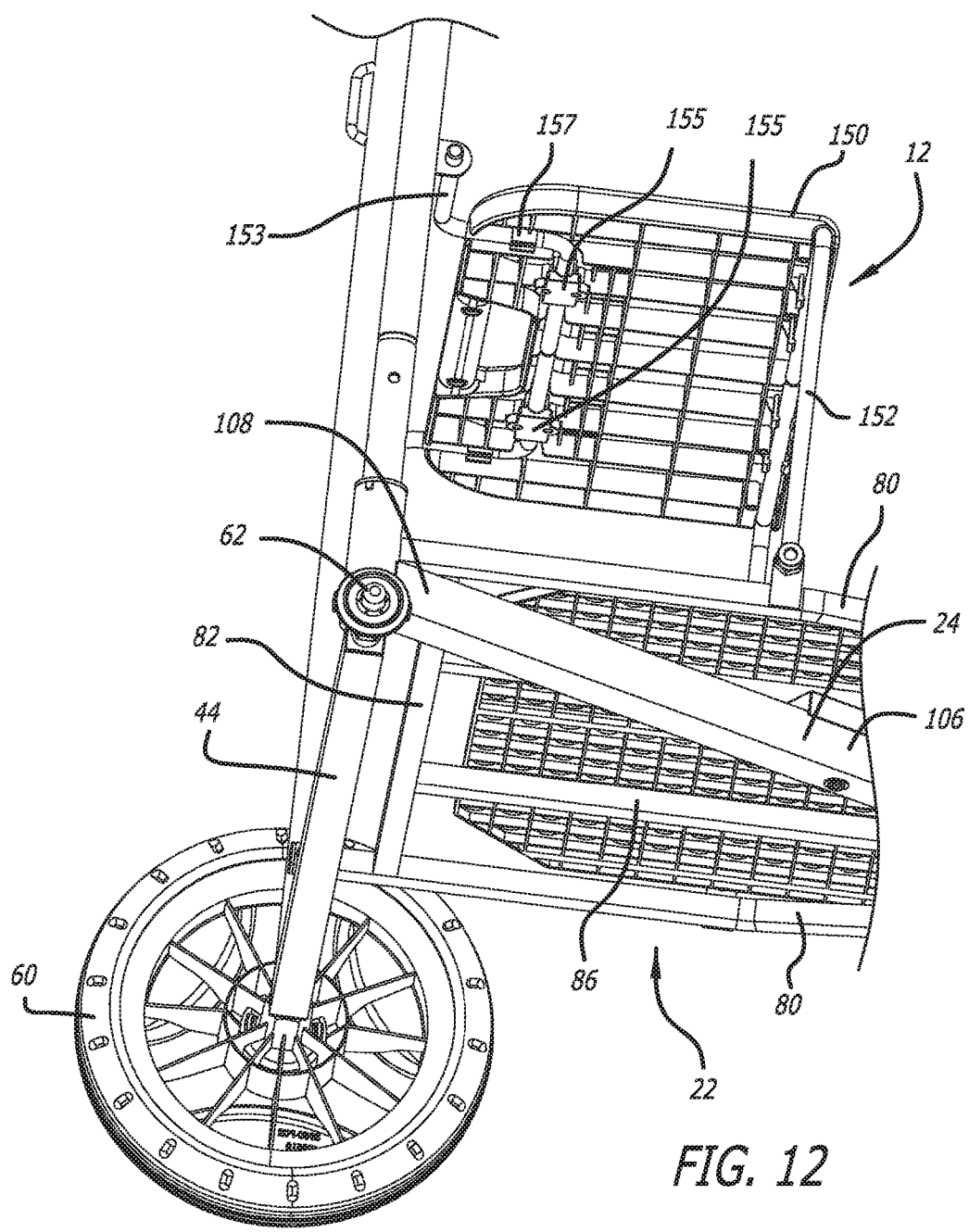
FIG. 12 is a partial bottom perspective view of the rear seat of the folding wagon of FIG. 9 with the seat in the use position.
Figure 13:
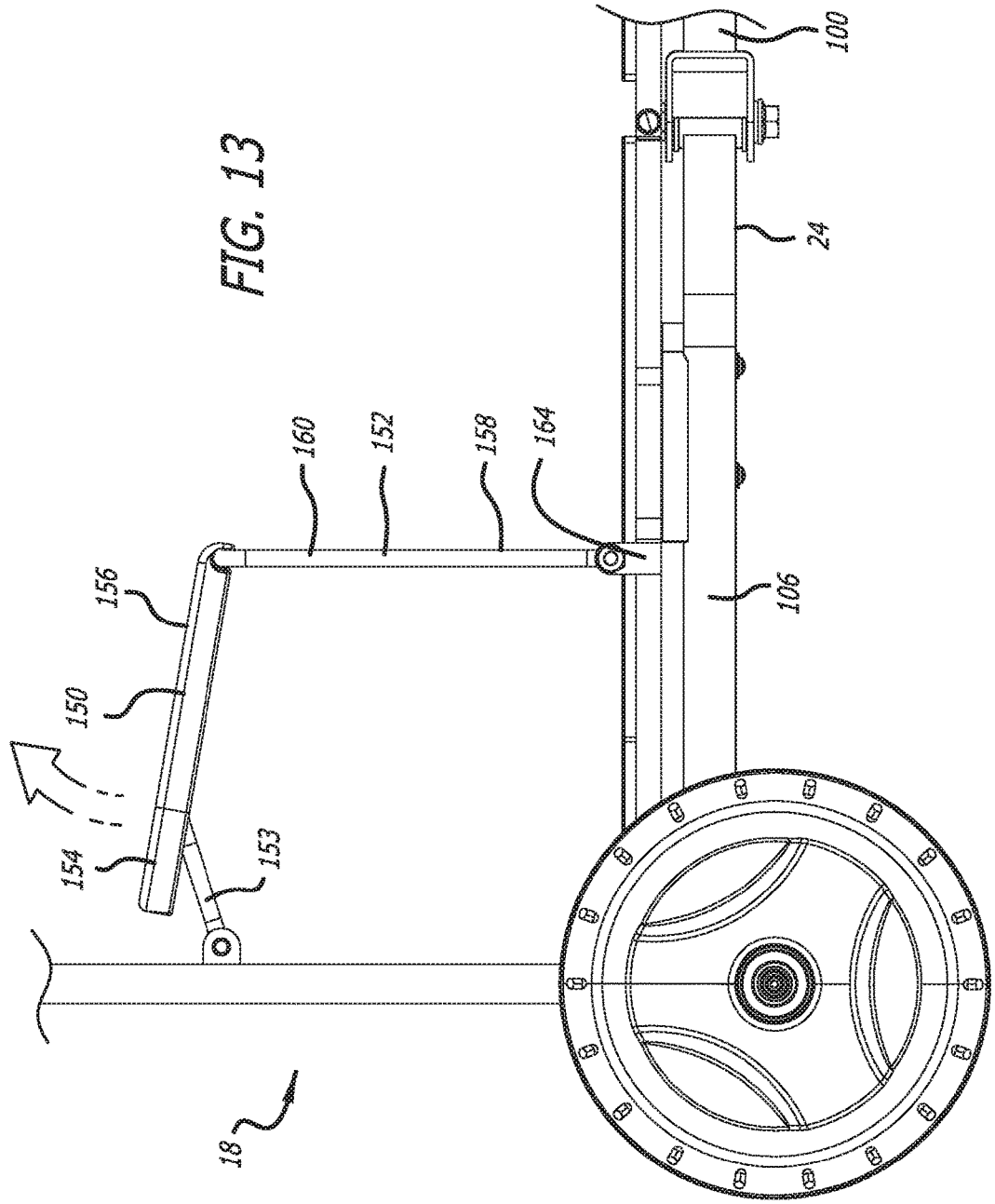
FIG. 13 is a partial side elevation view of the foldable wagon of FIG. 9 illustrating a first step in transitioning the seat from the use position to the folded or storage position.
Figure 14:
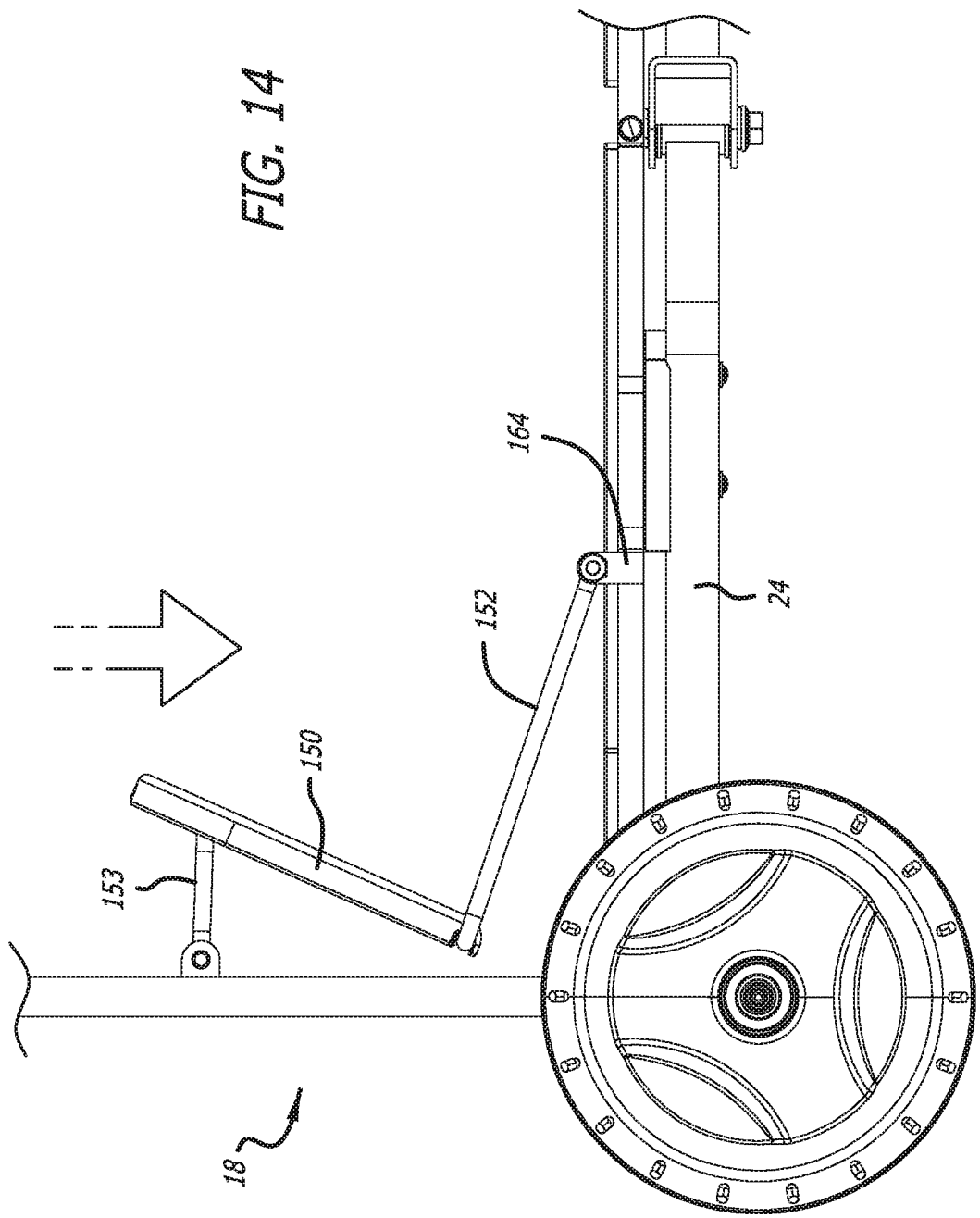
FIG. 14 is a partial side elevation view of the foldable wagon of FIG. 9 illustrating a subsequent step in transitioning the seat from the use position to the folded or storage position.
Figure 15:
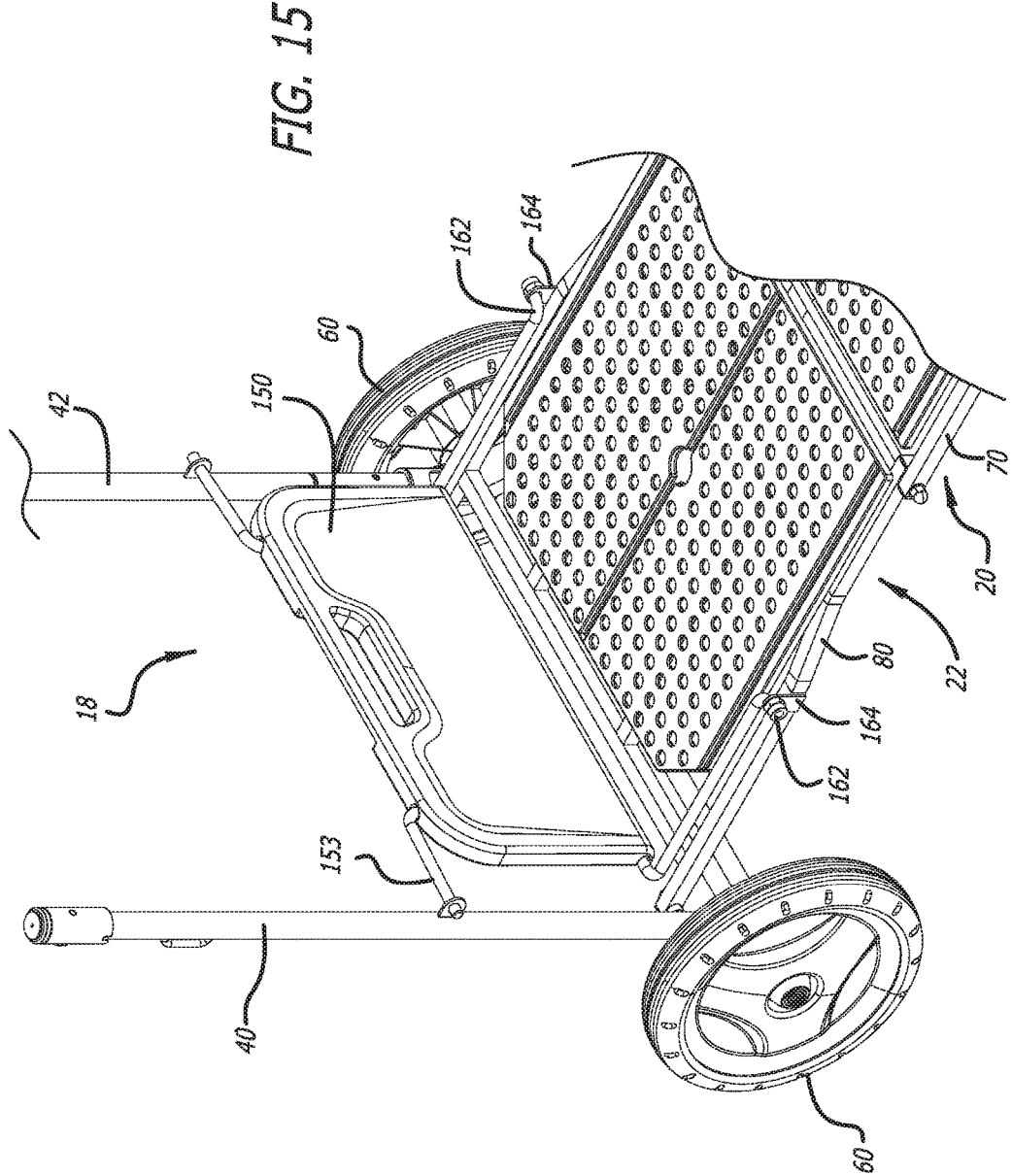
FIG. 15 is a partial top perspective view of the wagon of FIG. 9 illustrating the final step in placing the seat in the folded or storage position.
Figure 16:
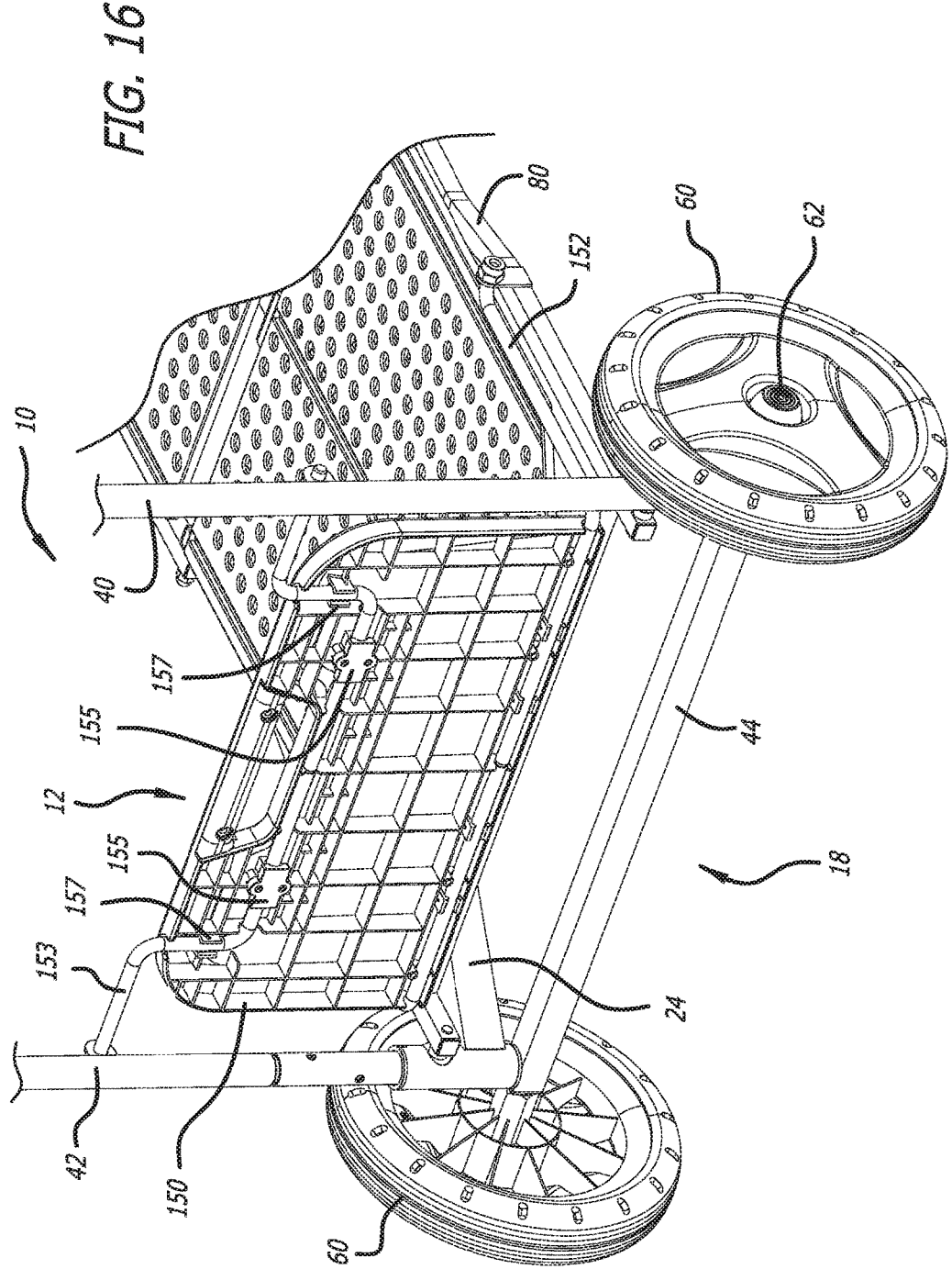
FIG. 16 is a partial rear perspective view of the wagon of FIG. 15 illustrating the seat in the folded or storage position.
Figure 17:
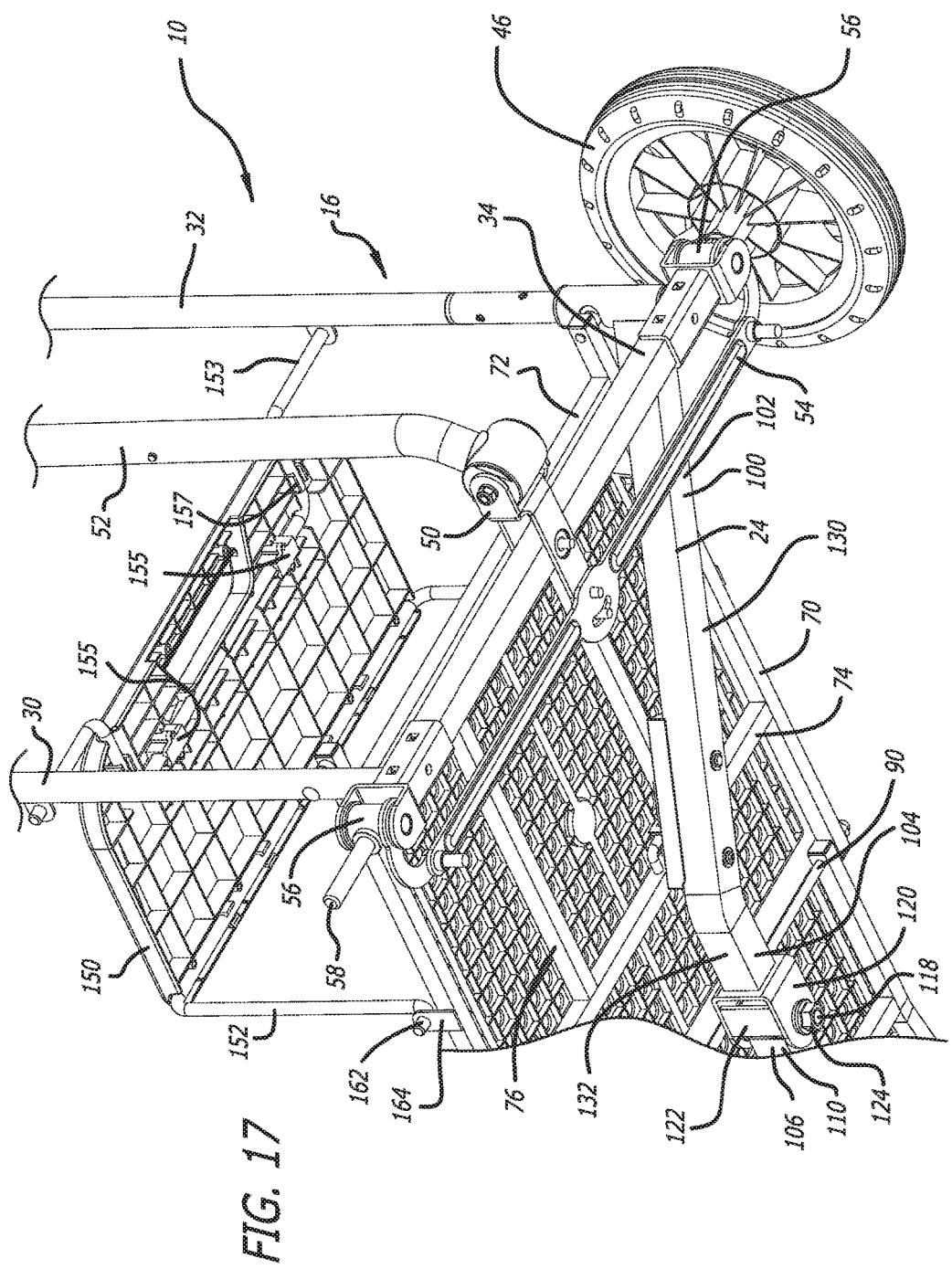
FIG. 17 is a partial bottom front perspective view of the steering assembly of the wagon of FIG. 9.

As shown in the figures, the wagon 10 also includes at least one foldable seat assembly 12, and in preferred embodiments there is a first foldable seat assembly 12 adjacent the first end assembly 16 and a second foldable seat assembly 12 adjacent the second end assembly 18 of the wagon 10 (See FIGS. 1, 3 and 9). In one embodiment the foldable seat assemblies 12 comprise a seat top portion 150 (also referred to as the seat 150, and preferably referred to as a first seat 150 adjacent the first end assembly 16 and a second seat 150 adjacent the second end assembly 18), a seat bottom portion 152 (also referred to as the front support 152 for the seat 150), and a rear support 153. Preferably, the seat bottom or front support 152 is pivotally connected to the seat 150. In one embodiment the seat 150 has a first end 154 and a second end 156. Similarly, the seat bottom or front support 152 for the seat 150 has a first end 158 and a second end 160. In various embodiments, the first end 154 of the first seat 150 is adjacent the first end assembly 16 and is pivotally connected to and extends from the first end assembly 16, preferably via the rear support 153. In various embodiments the first end 154 of the first seat 150 is pivotally connected to the first end assembly 16 between the two vertical members 30, 32 of the first end assembly 16. In one embodiment, as shown in FIGS. 1-6, shoulder bolts or other rotatable fastening mechanisms operate as the rear support 153 and may be used to pivotally connect the first end 154 of the first seat 150 between and to the two vertical members 30, 32 of the first end assembly 16 (see FIG. 1). Alternately, in another embodiment, as shown in FIGS. 12-16, the rear support 153 comprises a bent shaft that pivotally connects the first seat 150 to the first end assembly 16. The bent shaft type of rear support 153 allows the seat to go over center and be moved from the use position to the storage position without removing any rear support 153 or the front support 152 from the wagon. In this embodiment, the ends of the rear support 153 are pivotally connected to the first end assembly 16. In this embodiment the rear support 153 is pivotally connected to the first seat 150 adjacent the first end 154 of the first seat 150. In one embodiment, as shown in FIG. 16, retainers 155 pivotally fix the rear support 153 to the first seat 150. Additionally, clamps 157 on the bottom of the first seat 150 removably secure the rear support 153 to the first seat 150 in the up or use position as shown in FIG. 12, and in the lower or storage position as shown in FIG. 16. However, the rear support 153 can disengage from the clamps 157, as shown in FIGS. 13 and 14, to allow the seat assembly 12 to be rotated between the use and storage positions, and then the rear support 153 can be reinserted into the clamps 157 in the first seat 150 in the use and storage positions to lock the seat assembly 12 in place.

The second end 156 of the first seat 150 is pivotally connected to the second end 160 of the front support 152. Further, the first end 158 of the front support 152 has a first mating member 162, such as extensions 162 extending therefrom that pivotally mate with receivers 164 extending from or secured to the first floor assembly 20. In one embodiment, the receivers 164 are secured to the floor panel 88 of the first floor assembly 20. Alternately, the first end 158 of the front support 152 may have a receiver and mating members may be a component of the first floor assembly 20. In a further alternate, as shown in FIG. 11, the front support 152 may have a bent portion that operates as a first mating member 162 to engage a receiver 164 extending from the first floor assembly 20. In this seat-use configuration as shown in FIGS. 1 and 9, the first seat 150 is generally horizontal and transverse to the first end assembly 16, and the front support 152 is generally vertical to pivotally support the second end 156 of the first seat 150.

Figure 4:
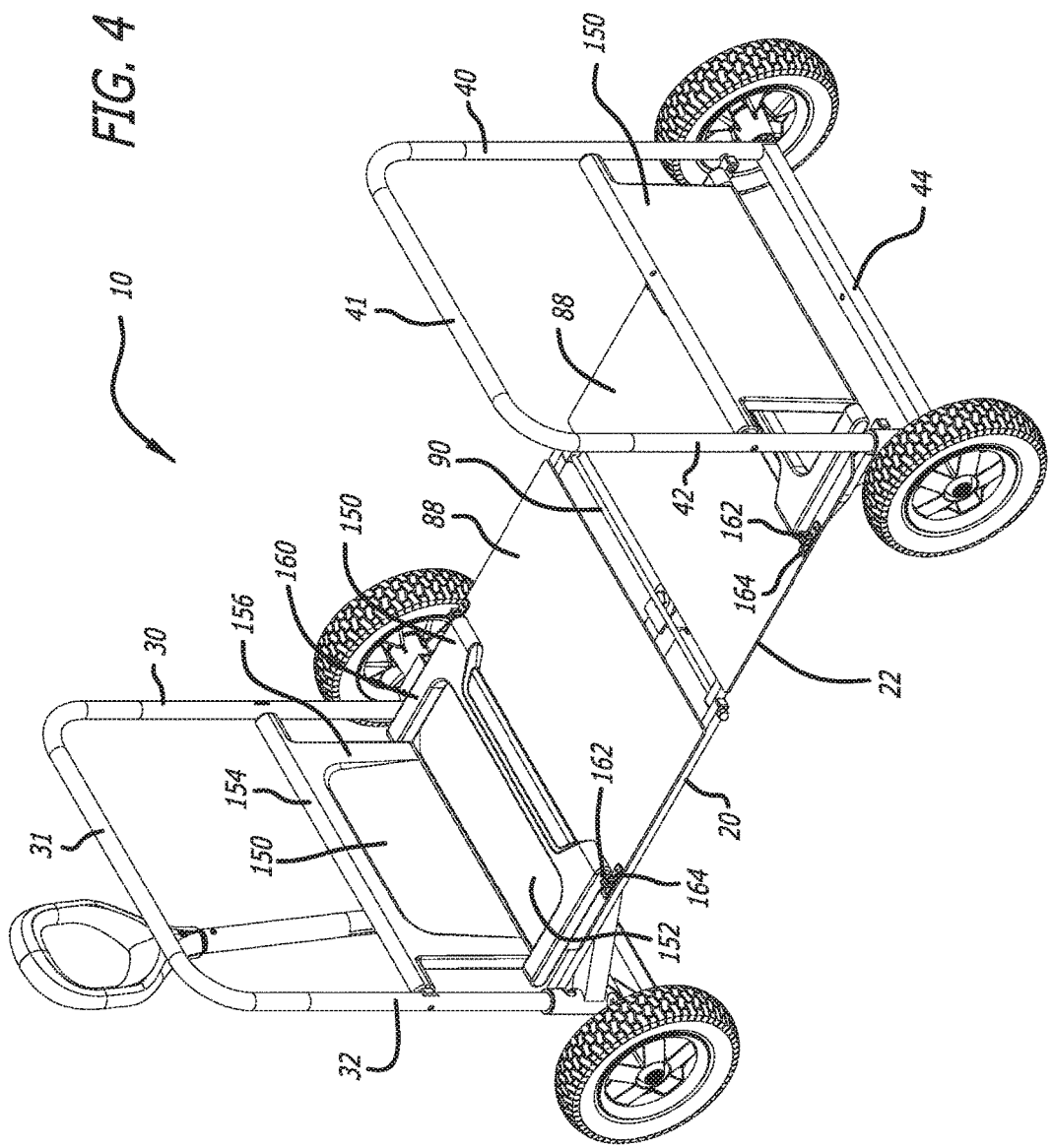
FIG. 4 is a top rear perspective view of the folding wagon of FIG. 1 with the seats folded down.
Figure 5:
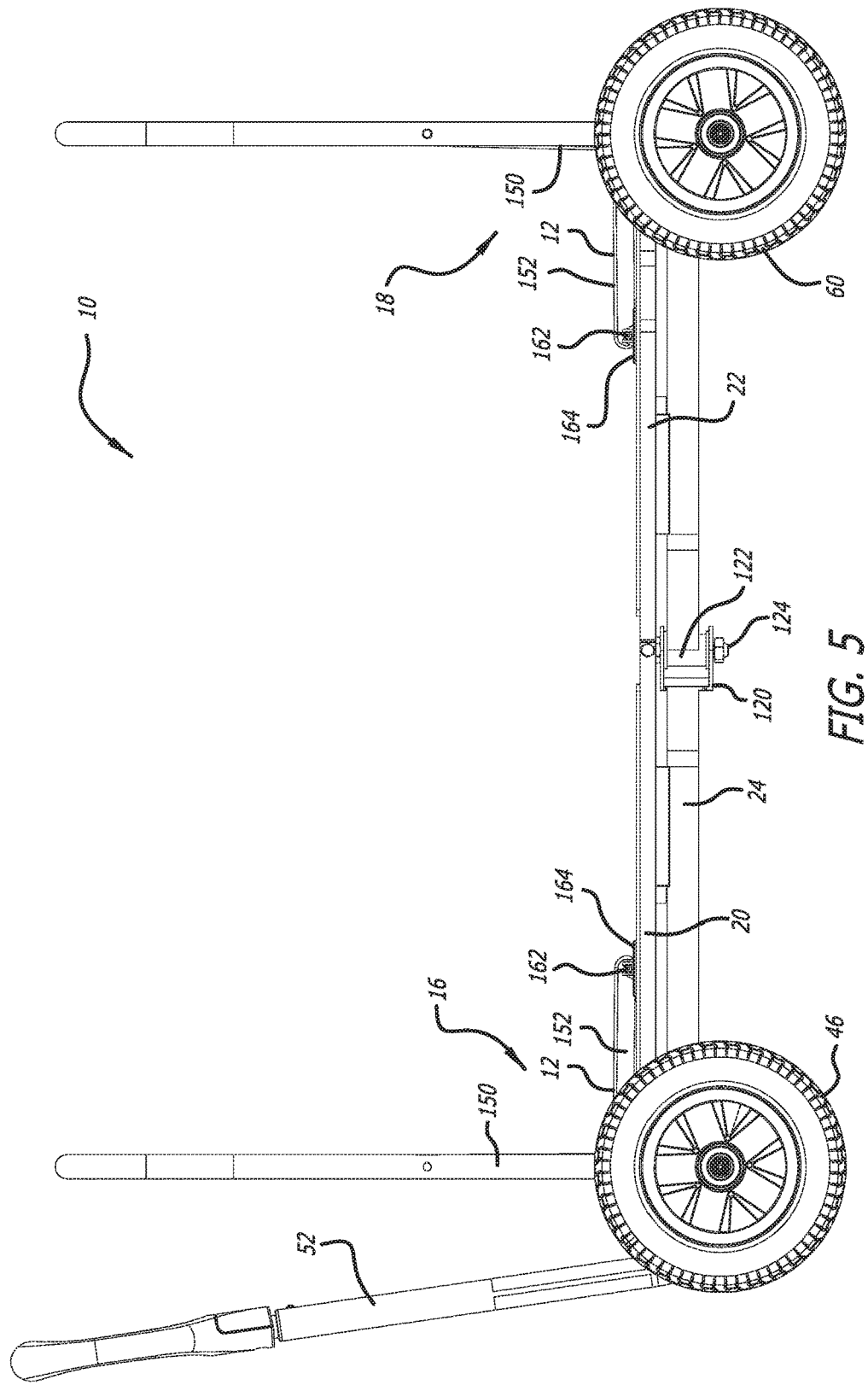
FIG. 5 is a side elevation view of the folding wagon of FIG. 4.
Figure 6:
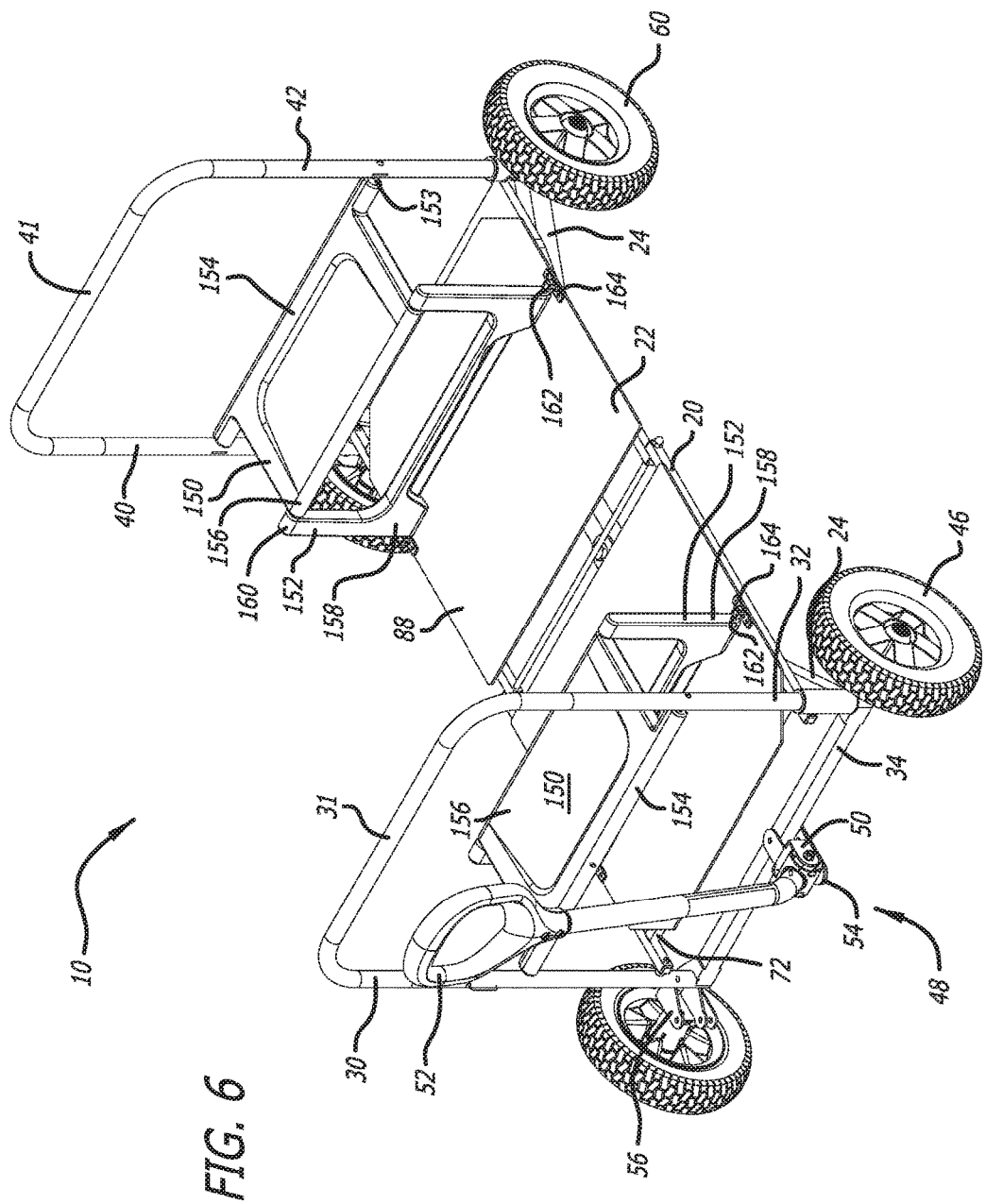
FIG. 6 is a top front perspective view of the wagon of FIG. 1.

To convert the seat assembly from the use configuration to the storage configuration, in one embodiment, as shown in FIGS. 1-4, the user may disengage the front support 152 from the receivers 154 and invert the foldable seat assembly 12 as shown in FIGS. 4 and 5 for more cargo space. In this inverted-use or storage configuration the first seat 150 is rotated downwardly toward the first floor assembly 20 in a generally vertical orientation with the second end 156 of the first seat 150 being adjacent the front corner of the wagon 10. Thus, in the storage position the first seat 150 is generally parallel and adjacent to the first end assembly 16. The second end 160 of the front support 152, which is pivotally connected to the second end 156 of the first seat 150, is similarly located adjacent the front corner of the wagon 10, with the front support 152 being generally horizontal and adjacent the first floor assembly 20. Further, in the embodiment of FIGS. 1-4 the first mating member 162 of the front support 152 may be reinserted into the mating receivers 164 of the first floor assembly 20. Thus, the front support 152 is generally parallel and adjacent to the first floor assembly 20. In the embodiment of FIGS. 9-17, however, neither the front support 152 nor the rear support 153 is required to be removed or disengaged from engagement with the wagon to convert the first seat 150 from the use to the storage position. As explained herein, in the embodiment of FIGS. 9-17, because the rear support 153 comprises a bent shaft that is pivotally connected to the first seat 150 with the use of retainers 155, but also partially removable from the first seat 150 at the clamps 157, the first seat 150 can be raised up and disengaged from the rear support 153 at the clamps 157, as shown in FIGS. 13 and 14, to allow the first seat 150 to be rotated between the use and storage positions, and then when the first seat 150 is in the storage position generally parallel adjacent the first end assembly and the front support 152 is adjacent and generally parallel to the first floor assembly 20, the rear support 153 can be reinserted into the clamps 157 in the first seat 150 to lock the first seat assembly 12 in the storage position as shown in FIGS. 15 and 16. To move the first seat assembly 12 from the storage position to the use position the opposite operation is conducted.

Similarly, in various embodiments, the first end 154 of the second seat 150 is adjacent the second end assembly 18 and is pivotally connected to and extends from the second end assembly 18, preferably via the rear support 153. In various embodiments the first end 154 of the second seat 150 is pivotally connected to the second end assembly 18 between the two vertical members 30, 32 of the second end assembly 18. In one embodiment, as shown in FIGS. 1-6, shoulder bolts or other rotatable fastening mechanisms operate as the rear support 153 and may be used to pivotally connect the first end 154 of the second seat 150 between and to the two vertical members 30, 32 of the second end assembly 18 (see FIG. 1). Alternately, in another embodiment, as shown in FIGS. 12-16, the rear support 153 comprises a bent shaft that pivotally connects the second seat 150 to the second end assembly 18. The bent shaft type of rear support 153, as explained with respect to the first seat 150, allows the second seat 150 to go over center and be moved from the use position to the storage position without removing any rear support 153 or the front support 152 from the wagon. In this embodiment, the ends of the rear support 153 are pivotally connected to the second end assembly 18. In this embodiment the rear support 153 is pivotally connected to the second seat 150 adjacent the first end 154 of the second seat 150. In one embodiment, as shown in FIG. 16, retainers 155 pivotally fix the rear support 153 to the second seat 150. Additionally, clamps 157 on the bottom of the second seat 150 removably secure the rear support 153 to the second seat 150 in the up or use position as shown in FIG. 12, and in the lower or storage position as shown in FIG. 16. However, the rear support 153 can disengage from the clamps 157, as shown in FIGS. 13 and 14, to allow the seat assembly 12 to be rotated between the use and storage positions, and then the rear support 153 can be reinserted into the clamps 157 in the second seat 150 in the use and storage positions to lock the seat assembly 12 in place.

The second end 156 of the second seat 150 is pivotally connected to the second end 160 of the front support 152. Further, the first end 158 of the front support 152 has a first mating member 162, such as extensions 162 extending therefrom that pivotally mate with receivers 164 extending from or secured to the second floor assembly 22. In one embodiment, the receivers 164 are secured to the floor panel 88 of the second floor assembly 22. Alternately, the first end 158 of the front support 152 may have a receiver and mating members may be a component of the second floor assembly 22. In a further alternate, as shown in FIG. 11, the front support 152 may have a bent portion that operates as a first mating member 162 to engage a receiver 164 extending from the second floor assembly 22. In this seat-use configuration as shown in FIGS. 1 and 9, the second seat 150 is generally horizontal and transverse to the second end assembly 18, and the front support 152 is generally vertical to pivotally support the second end 156 of the second seat 150.

To convert the seat assembly for the second seat 150 from the use configuration to the storage configuration, in one embodiment, as shown in FIGS. 1-4, the user may disengage the front support 152 from the receivers 154 and invert the foldable seat assembly 12 as shown in FIGS. 4 and 5 for more cargo space. In this inverted-use or storage configuration the second seat 150 is rotated downwardly toward the second floor assembly 22 in a generally vertical orientation with the second end 156 of the second seat 150 being adjacent the rear corner of the wagon 10. Thus, in the storage position the second seat 150 is generally parallel and adjacent to the second end assembly 18. The second end 160 of the front support 152, which is pivotally connected to the second end 156 of the second seat 150, is similarly located adjacent the rear corner of the wagon 10, with the front support 152 being generally horizontal and adjacent the second floor assembly 22. Further, in the embodiment of FIGS. 1-4 the first mating member 162 of the front support 152 may be reinserted into the mating receivers 164 of the second floor assembly 22. Thus, the front support 152 is generally parallel and adjacent to the second floor assembly 22. In the embodiment of FIGS. 9-17, however, neither the front support 152 nor the rear support 153 is required to be removed or disengaged from engagement with the wagon to convert the second seat 150 from the use to the storage position. As explained herein, in the embodiment of FIGS. 9-17, because the rear support 153 comprises a bent shaft that is pivotally connected to the second seat 150 with the use of retainers 155, but also partially removable from the second seat 150 at the clamps 157, the second seat 150 can be raised up and disengaged from the rear support 153 at the clamps 157, as shown in FIGS. 13 and 14, to allow the second seat 150 to be rotated between the use and storage positions, and then when the second seat 150 is in the storage position generally parallel adjacent the first end assembly and the front support 152 is adjacent and generally parallel to the second floor assembly, the rear support 153 can be reinserted into the clamps 157 in the second seat 150 to lock the second seat assembly 12 in the storage position as shown in FIGS. 15 and 16. To move the second seat assembly 12 from the storage position to the use position the opposite operation is conducted. It is understood that the wagon is moveable from the open configuration to the folded configuration when the first and second seats are in the use position or when the first and second seats are in the storage position.

In the seat-use orientation a cavity 170 is provided under the seat top 150. This cavity 170 may be accessed through a closable opening in the housing assembly 26, such as a closeable opening in the end portions 142. Additionally, in the seat-use orientation of the seats 12, preferably approximately 7" of sidewall portions 140 of the housing assembly 26 will be provided above the seat top 150, and approximately 7" of the housing assembly 26 will be provided below the seat top 150.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A wagon, comprising:
    a frame having a first end assembly and an opposing second end assembly;
    a floor assembly;
    a first rear wheel rotatably connected to one of the frame and the second end assembly;
    a second rear wheel rotatably connected to one of the frame and the second end assembly;
    a first front wheel pivotally and rotatably connected to one of the frame and the first end assembly;
    a second front wheel pivotally and rotatably connected to one of the frame and the first end assembly;
    a steering link pivotally connected to the first end assembly;
    a handle pivotally connected to the steering link;
    a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon;
    a first seat assembly adjacent the first end assembly, the first seat assembly comprising a first seat, a front support for the first seat, and a rear support for the first seat, wherein the front support for the first seat is pivotally connected to a second end of the first seat and pivotally connected to the wagon frame, wherein the rear support for the first seat is pivotally connected adjacent a first end of the first seat and pivotally connected to the first end assembly, wherein the first seat is positionable in a use position such that the first seat is transverse to the first end assembly, and a storage position such that the first seat is adjacent and generally parallel to the first end assembly; and,
    a second seat assembly adjacent the second end assembly, the second seat assembly comprising a second seat, a front support for the second seat, and a rear support for the second seat, wherein the front support for the second seat is pivotally connected to a second end of the second seat and pivotally connected to the wagon frame, wherein the rear support for the second seat is pivotally connected adjacent a first end of the second seat and pivotally connected to the second end assembly, wherein the second seat is positionable in a use position such that the second seat is transverse to the second end assembly, and a storage position such that the second seat is adjacent and generally parallel to the second end assembly.

2. The wagon of claim 1, wherein the floor assembly comprises a first floor assembly pivotal with respect to the first end assembly and a second floor assembly pivotal with respect to the second end assembly, and further comprising a linkage assembly having a first linkage pivotally connected to the first end assembly and a second linkage pivotally connected to the second end assembly, wherein the first linkage is also pivotally connected to the second linkage.

3. The wagon of claim 2, wherein the wagon is moveable between an open configuration and a folded configuration, and wherein the linkage assembly is positioned below the floor assembly in both the open configuration and the folded configuration.

4. The wagon of claim 3, wherein the wagon is moveable from the open configuration to the folded configuration when the first and second seats are in the use position and when the first and second seats are in the storage position.

5. The wagon of claim 2, wherein the wagon is moveable between an open configuration and a folded configuration, wherein in transitioning from the open configuration to the folded configuration the floor assembly moves in a first plane and the linkage assembly moves in a second plane, and wherein the first and second planes are perpendicular.

6. The wagon of claim 1, wherein the front support for the first seat is positioned generally transverse to the first floor assembly in the use position of the first seat, wherein the front support for the first seat is positioned generally parallel to the first floor assembly in the storage position of the first seat, wherein the front support for the second seat is positioned generally transverse to the second floor assembly in the use position of the second seat, and wherein the front support for the second seat is positioned generally parallel to the second floor assembly in the storage position of the second seat.

7. The wagon of claim 1, wherein in an open configuration of the wagon the first floor assembly and the second floor assembly are positioned below a top of the wheels of the wagon.

8. The wagon of claim 1, wherein the steering link is pivotable in a first direction, wherein the handle is pivotable in the steering link in a second direction, and wherein the first direction is substantially perpendicular to the second direction.

9. A wagon, comprising:
a frame having a first end assembly and an opposing second end assembly;
a handle connected to the wagon adjacent a first end of the frame;
a floor assembly connected to the frame between the first end assembly and the second end assembly;
a first rear wheel rotatably connected to the frame;
a second rear wheel rotatably connected to the frame;
a first front wheel rotatably connected to the frame;
a second front wheel rotatably connected to the frame;
a first seat assembly adjacent the first end assembly, the first seat assembly comprising a first seat, a front support for the first seat, and a rear support for the first seat, wherein the front support for the first seat is pivotally connected to a second end of the first seat and pivotally connected to the wagon frame, wherein the rear support for the first seat is pivotally connected adjacent a first end of the first seat and pivotally connected to the first end assembly, wherein the first seat is positionable in a use position such that the first seat is transverse to the first end assembly, and a storage position such that the first seat is adjacent and generally parallel to the first end assembly; and,
a second seat assembly adjacent the second end assembly, the second seat assembly comprising a second seat, a front support for the second seat, and a rear support for the second seat, wherein the front support for the second seat is pivotally connected to a second end of the second seat and pivotally connected to the wagon frame, wherein the rear support for the second seat is pivotally connected adjacent a first end of the second seat and pivotally connected to the second end assembly, wherein the second seat is positionable in a use position such that the second seat is transverse to the second end assembly, and a storage position such that the second seat is adjacent and generally parallel to the second end assembly.

10. The wagon of claim 9, wherein the first front wheel is pivotally and rotatably connected to the first end assembly, wherein the second front wheel is pivotally and rotatably connected to the first end assembly, and further comprising a steering link pivotally connected to the first end assembly, the handle being pivotally connected to the steering link, and a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

11. The wagon of claim 10, wherein the steering link is pivotable in a first direction, wherein the handle is pivotable in the steering link in a second direction, and wherein the first direction is substantially perpendicular to the second direction.

12. The wagon of claim 9, wherein the floor assembly comprises a first floor assembly pivotal with respect to the first end assembly, and a second floor assembly pivotal with respect to the second end assembly, and further comprising a linkage assembly having a first linkage pivotally connected to the first end assembly and a second linkage pivotally connected to the second end assembly, wherein the first linkage is also pivotally connected to the second linkage.

13. The wagon of claim 12, wherein the wagon is moveable between an open configuration and a folded configuration, and wherein the linkage assembly is positioned below the floor assembly in both the open configuration and the folded configuration.

14. The wagon of claim 12, wherein the wagon is moveable between an open configuration and a folded configuration, wherein in transitioning from the open configuration to the folded configuration the floor assembly moves in a first plane and the linkage assembly moves in a second plane, and wherein the first and second planes are perpendicular.

15. The wagon of claim 9, wherein the wagon is moveable from an open configuration to a folded configuration when the first and second seats are in the use position and when the first and second seats are in the storage position.

16. The wagon of claim 9, further comprising a fabric housing around the frame of the wagon.

17. A wagon, comprising:
a frame having a first end assembly and an opposing second end assembly;
a floor assembly comprising a first floor assembly pivotal with respect to the first end assembly and a second floor assembly pivotal with respect to the second end assembly;
a first rear wheel rotatably connected to one of the frame and the second end assembly;
a second rear wheel rotatably connected to one of the frame and the second end assembly;
a first front wheel pivotally and rotatably connected to one of the frame and the first end assembly;
a second front wheel pivotally and rotatably connected to one of the frame and the first end assembly;
a steering link pivotally connected to the first end assembly;
a handle pivotally connected to the steering link;
a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon; and, a linkage assembly having a first linkage pivotally connected to the first end assembly and a second linkage pivotally connected to the second end assembly, the first linkage also being pivotally connected to the second linkage, wherein the wagon is moveable between an open configuration and a folded configuration, and wherein in the open configuration of the wagon the first floor assembly and the second floor assembly are positioned below a top of the wheels of the wagon.

18. The wagon of claim 17, wherein in transitioning from the open configuration to the folded configuration the floor assembly moves in a first plane and the linkage assembly moves in a second plane, and wherein the first and second planes are perpendicular.

19. The wagon of claim 17, wherein the linkage assembly is positioned below the floor assembly in both the open configuration and the folded configuration.

20. The wagon of claim 17, further comprising a first seat assembly adjacent the first end assembly, the first seat assembly comprising a first seat, a front support for the first seat, and a rear support for the first seat, wherein the front support for the first seat is pivotally connected to a second end of the first seat and pivotally connected to the wagon frame, wherein the rear support for the first seat is pivotally connected adjacent a first end of the first seat and pivotally connected to the first end assembly, wherein the first seat is positionable in a use position such that the first seat is transverse to the first end assembly, and a storage position such that the first seat is adjacent and generally parallel to the first end assembly; and, a second seat assembly adjacent the second end assembly, the second seat assembly comprising a second seat, a front support for the second seat, and a rear support for the second seat, wherein the front support for the second seat is pivotally connected to a second end of the second seat and pivotally connected to the wagon frame, wherein the rear support for the second seat is pivotally connected adjacent a first end of the second seat and pivotally connected to the second end assembly, wherein the second seat is positionable in a use position such that the second seat is transverse to the second end assembly, and a storage position such that the second seat is adjacent and generally parallel to the second end assembly.

* * * * *